W. VAN GAASBEEK.
Lid-Lifters.

No. 146,035.            Patented Dec. 30, 1873.

Witnesses.
J. T. Punderson
E. W. Kimball

Inventor
Washington Van Gaasbeek

UNITED STATES PATENT OFFICE.

WASHINGTON VAN GAASBEEK, OF HUDSON, NEW YORK.

IMPROVEMENT IN LID-LIFTERS.

Specification forming part of Letters Patent No. 146,035, dated December 30, 1873; application filed April 5, 1873.

*To all whom it may concern:*

Be it known that I, WASHINGTON VAN GAASBEEK, of the city of Hudson, in the county of Columbia and State of New York, have invented a new and useful Improvement in Holders and Lifters for Holding, Lifting, and Moving Pans and Basins; and I do hereby declare that the following is a full, clear, and exact description of the construction and operation of the same, reference being had to the annexed drawings making a part of this specification, in which—

Figure 1:
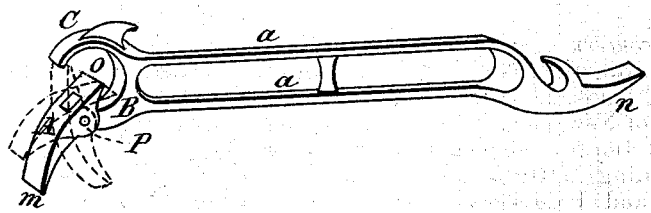
Figure 2:
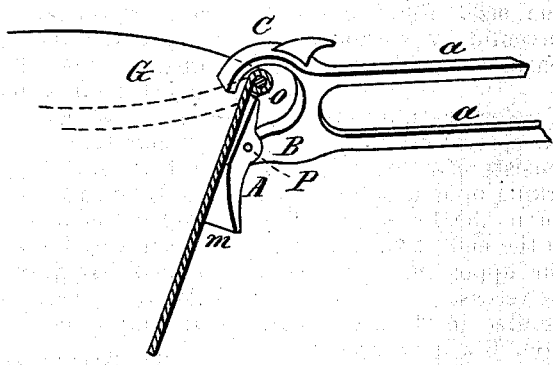

Figure 1 is a perspective view of my invention, one-half the usual size. Fig. 2 shows the application of my invention, a section of the rim and side of a basin being shown as held by the holder.

Similar letters of reference indicate corresponding parts in the several figures.

This invention consists of a self-adjusting retaining-lever, working upon a fulcrum-pin, by which it is hinged to the lower projection of an open recess in the end of the handle in such manner that the upper end of the lever shall work within the recess.

To enable others skilled in the art to make and use my invention, I will proceed to describe its construction and operation.

It is made of cast or malleable iron, or any material of sufficient strength, in two parts, connected by the fulcrum-pin P, as shown in Fig. 1. A is the retaining-lever, working within the recess, as shown by dotted lines. $a\ a$ is the handle, with a recess, O, formed by the projections B and C, the lever A being hinged to the lower projection B by the fulcrum-pin P, upon which it works freely. $m$ and $n$ are stove-cover lifters.

Now, when the curved projection C is passed over the edge of a pan or basin, G, as shown in Fig. 2, and the hand lowered so that any part of the lever below the fulcrum-pin strikes the vessel, the upper part of the lever A is pressed against and bites upon the outside of the vessel under the rim or wire, and, in connection with the projection C, firmly holds the same, and the vessel may then be raised and carried about without danger of falling; and so long as the vessel is sustained the lever will maintain its hold, but when the vessel is set down and the hand raised the lever immediately releases its hold.

What I claim as my invention, and desire to secure by Letters Patent, is—

The self-adjusting lever A, in combination with the projection C, substantially as described, and for the purposes set forth.

WASHINGTON VAN GAASBEEK.

Witnesses:
F. T. PUNDERSON,
E. W. KIMBALL.